United States Patent
Woods, Jr.

(10) Patent No.: US 12,066,860 B2
(45) Date of Patent: Aug. 20, 2024

(54) WEARABLE ACCESSORY WITH PHASED ARRAY ANTENNA SYSTEM

(71) Applicant: GlaiveRF, Inc., Burlington, MA (US)

(72) Inventor: Wayne H. Woods, Jr., Burlington, MA (US)

(73) Assignee: GLAIVERF, INC., Burlington, MA (US)

(*) Notice: Subject to any disclaimer, the term of this patent is extended or adjusted under 35 U.S.C. 154(b) by 780 days.

(21) Appl. No.: 17/097,216

(22) Filed: Nov. 13, 2020

(65) Prior Publication Data
US 2022/0155817 A1    May 19, 2022

(51) Int. Cl.
*G06F 1/16* (2006.01)
*G04G 19/00* (2006.01)
(Continued)

(52) U.S. Cl.
CPC ............ *G06F 1/163* (2013.01); *G04G 19/00* (2013.01); *G04R 60/10* (2013.01); *G06F 3/03547* (2013.01); *H01Q 1/242* (2013.01); *H01Q 1/273* (2013.01); *H01Q 3/2658* (2013.01); *H01Q 21/24* (2013.01)

(58) Field of Classification Search
CPC .... G06F 1/163; G06F 3/03547; G06F 1/1626; G06F 1/1698; G04G 19/00; G04G 21/04; G04R 60/10; H01Q 1/242; H01Q 1/273; H01Q 3/2658; H01Q 21/24; H01Q 3/28; H01Q 3/30
See application file for complete search history.

(56) References Cited

U.S. PATENT DOCUMENTS

| 9,646,511 B2 | 5/2017 | Jerauld |
| 9,866,286 B1 | 1/2018 | Qu et al. |

(Continued)

FOREIGN PATENT DOCUMENTS

| CN | 110673767 | 1/2020 |
| WO | 2020123012 | 6/2020 |
| WO | 2020154480 | 7/2020 |

OTHER PUBLICATIONS

International Search Report and Written Option of the International Searching Authority from PCT Application No. PCT/US2021/59120 dated Feb. 9, 2022, 11 pages.
(Continued)

*Primary Examiner* — Hoang V Nguyen
*Assistant Examiner* — Yonchan J Kim
(74) *Attorney, Agent, or Firm* — Andrew D. Wright; Calderon Safran & Wright P.C.

(57) ABSTRACT

An accessory for an electronic device includes: a watch comprising a housing and a band connected to the housing; at least one phased array antenna on the watch, the at least one phased array antenna comprising an array of antenna elements that are configured to form a beam in a determined direction, the at least one phased array antenna being configured to communicate wirelessly with an external device; a local communication system in the watch, the local communication system configured to communicate locally with the electronic device; and a battery in the watch, the battery operatively connected to each of the at least one phased array antenna and the local communication system.

20 Claims, 6 Drawing Sheets

(51) Int. Cl.
  *G04R 60/10* (2013.01)
  *G06F 3/0354* (2013.01)
  *H01Q 1/24* (2006.01)
  *H01Q 1/27* (2006.01)
  *H01Q 3/26* (2006.01)
  *H01Q 21/24* (2006.01)

(56) References Cited

U.S. PATENT DOCUMENTS

| | | |
|---|---|---|
| 10,165,426 B1 | 12/2018 | Jiang et al. |
| 10,817,594 B2 | 10/2020 | Setlak et al. |
| 2009/0180353 A1 | 7/2009 | Sander et al. |
| 2011/0317844 A1 | 12/2011 | Schreuder et al. |
| 2012/0262350 A1 | 10/2012 | Tesh et al. |
| 2014/0176367 A1 | 6/2014 | Manipatruni et al. |
| 2014/0187179 A1 | 7/2014 | Ferguson |
| 2016/0294225 A1* | 10/2016 | Blum ................. H02J 7/342 |
| 2016/0308563 A1* | 10/2016 | Ouyang ............. H01Q 25/005 |
| 2017/0053447 A1 | 2/2017 | Chen et al. |
| 2017/0109929 A1 | 4/2017 | Meier et al. |
| 2017/0235143 A1 | 8/2017 | Chi et al. |
| 2018/0294553 A1* | 10/2018 | Lim ..................... H01Q 5/35 |
| 2019/0089434 A1 | 3/2019 | Rainish et al. |
| 2019/0181538 A1 | 6/2019 | Xia et al. |
| 2019/0212566 A1 | 7/2019 | Lee et al. |
| 2019/0379428 A1 | 12/2019 | Lucas et al. |
| 2020/0053490 A1 | 2/2020 | Shriner et al. |
| 2020/0091601 A1 | 3/2020 | Pu et al. |

OTHER PUBLICATIONS

Basu et al. "Wearable phased arrays for sound localization and enhancement.", http://alumni.media.mit.edu/~sbasu/papers/iswc00.pdf, 2000, retrieved Nov. 13, 2021, 8 pages.

Anonymous, "5G Antenna Array Simulation for mmWave Wireless Virtual Reality Headsets", REMCOM Electromagnetic Simulation Software, https://www.remcom.com/examples/5g-antenna-array-simulation-for-mmwave-wireless-virtual-reality-headsets, 2019, 4 pages.

International Preliminary Report on Patentability issued in PCT/US2021/059120, dated May 16, 2023; 10 Pages.

\* cited by examiner

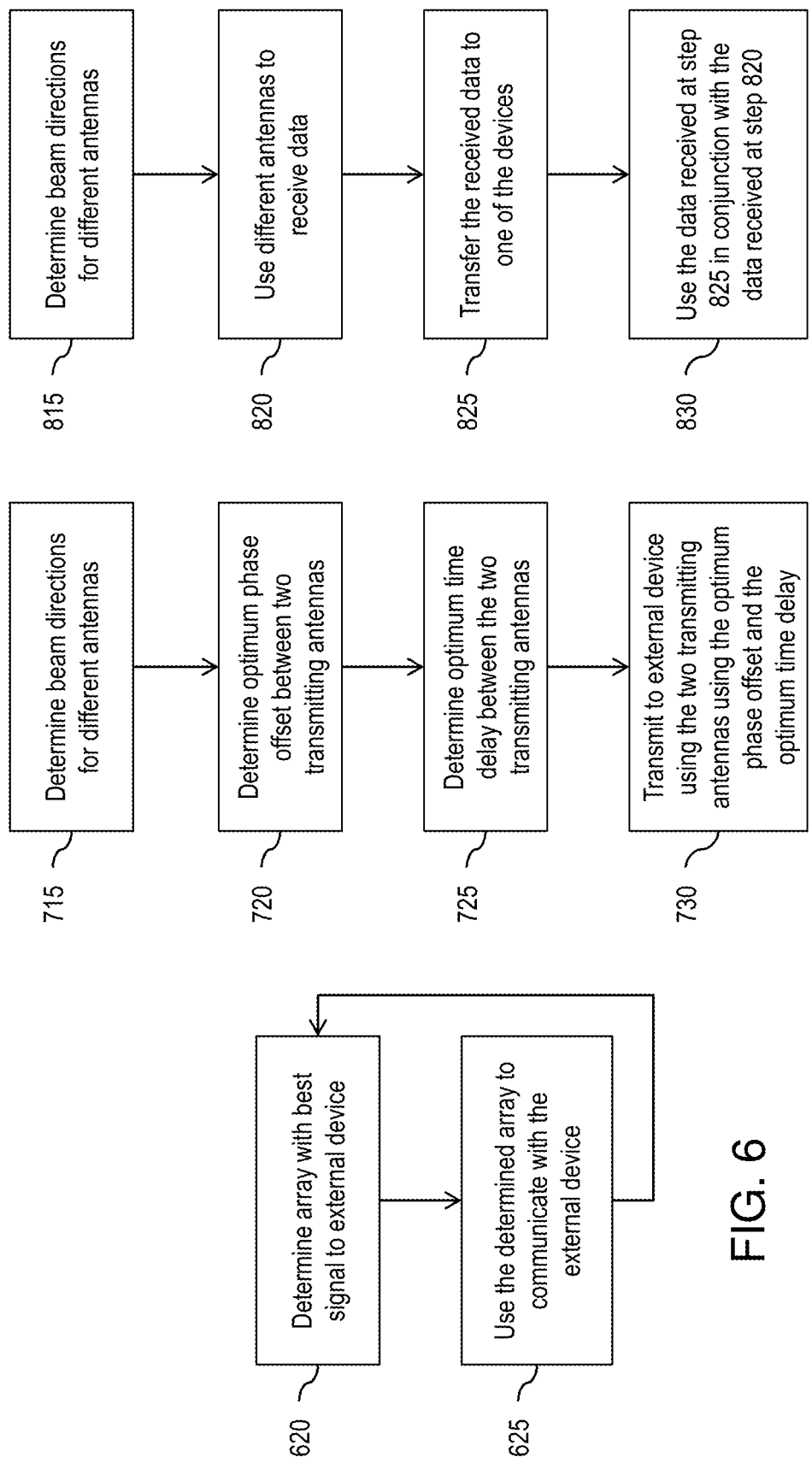

WEARABLE ACCESSORY WITH PHASED ARRAY ANTENNA SYSTEM

BACKGROUND

The present invention relates generally to wireless communication systems and, more particularly, to a wearable accessory having a phased array antenna system that is used for wireless communication on behalf of a mobile device.

Phase shifters are a component of phased array antenna systems which are used to directionally steer radio frequency (RF) beams for electronic communications or radar. A phased array antenna is a group of antennas in which the relative phases of the respective signals feeding the antennas are varied in such a way that the effective radiation pattern of the array is reinforced in a desired direction and suppressed in undesired directions. The relative amplitudes of, and constructive and destructive interference effects among, the signals radiated by the individual antennas determine the effective radiation pattern of the array. By controlling the radiation pattern through the constructive and destructive superposition of signals from the different antennas in the array, phased array antennas electronically steer the directionality of the antenna system, referred to as beam forming or beam steering. In such systems, the direction of the radiation (i.e., the beam) can be changed by manipulating the phase of the signal fed into each individual antenna of the array, e.g., using a phase shifter.

Generally speaking, a phased array antenna can be characterized as an active beam steering system. Active beam steering systems have actively tunable phase shifters at each individual antenna element to dynamically change the relative phase among the elements and, thus, are capable of changing the direction of the beam plural times. Tunable transmission line (t-line) phase shifters are one way of implementing such actively tunable phase shifters. Tunable t-line phase shifters typically employ active elements, such as switches, that change the state of an element within the phase shifter to change the phase of the signal that is passing through the phase shifter.

SUMMARY

In a first aspect of the invention, there is an accessory for an electronic device, the accessory including: a watch comprising a housing and a band connected to the housing; at least one phased array antenna on the watch, the at least one phased array antenna comprising an array of antenna elements that are configured to form a beam in a determined direction, the at least one phased array antenna being configured to communicate wirelessly with an external device; a local communication system in the watch, the local communication system configured to communicate locally with the electronic device; and a battery in the watch, the battery operatively connected to each of the at least one phased array antenna and the local communication system.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows a flowchart of an exemplary method in accordance with aspects of the invention.

FIG. 7 shows a flowchart of an exemplary method in accordance with aspects of the invention.

FIG. 8 shows a flowchart of an exemplary method in accordance with aspects of the invention.

DETAILED DESCRIPTION

Figure 1:
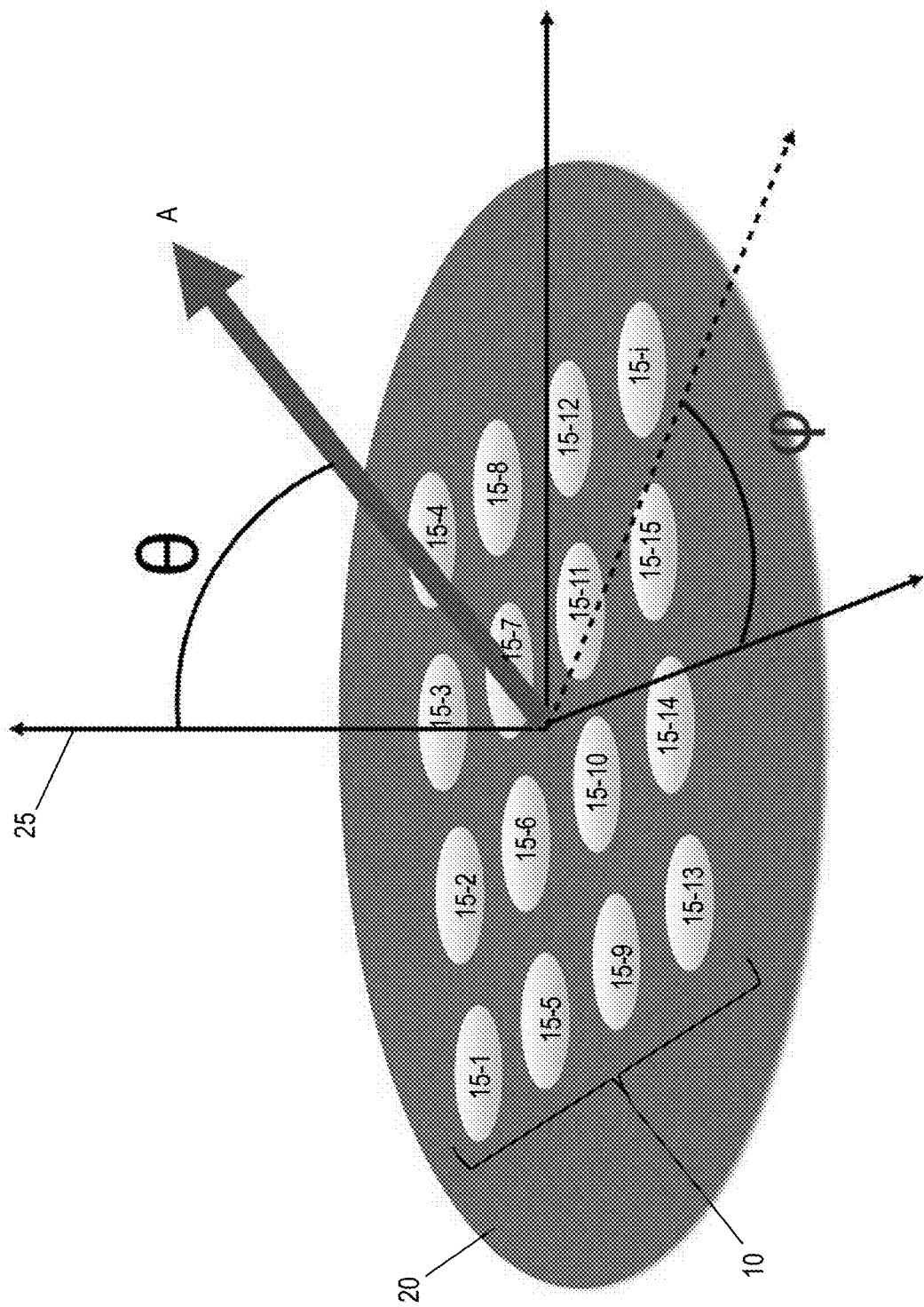
FIG. 1 shows an exemplary phased array antenna system that may be used with aspects of the invention.

The present invention relates generally to wireless communication systems and, more particularly, to a wearable accessory having a phased array antenna system that is used for wireless communication on behalf of a mobile device. The phased array antenna system comprises an array of antenna elements that are configured to form a beam in a determined direction. In embodiments, the accessory is wired or wirelessly connected to a mobile device and the phased array antenna system of the accessory is used to perform wireless communication for the mobile device.

In embodiments, the accessory comprises a watch (e.g., a smartwatch) that is configured to be worn or carried by a user. Due to the positioning of the watch on the body of a user in combination with the watch having different surfaces facing in plural different directions when the watch is worn by the user, the watch is in an optimal place for an antenna array. A watch having plural different phased array antennas on different surfaces facing in plural different directions is ideal for steering beams to different cell tower locations in crowded urban environments, where the relative position of the block-level millimeter wave towers may change rapidly as a user walks or goes around a corner. For example, during a first portion of a walk, the user's handheld electronic device might have the best line of sight to an external device (e.g., a base station antenna), and during a second portion of the same walk the same handheld electronic device might be obstructed from the external device while an antenna on the watch might have a clear line of sight to the external device.

According to aspects of the invention, a system determines which one of plural phased array antennas (including antennas on both the accessory and an electronic device (e.g., a mobile phone)) has a best transmission performance to an external device (e.g., a base station antenna), and the system uses the determined one of the antennas to communicate with the external device. In embodiments, while using the determined one of the antennas to communicate with the external device, the system does not use other ones of the antennas to communicate with the external device. In embodiments, the system frequently updates this determination and can use a different antenna to communicate with the external device based on an updated determination of an optimum (best) antenna.

According to further aspects of the invention, the system combines signal strength from plural different ones of the plural phased array antennas (including antennas on both the accessory and the electronic device) with determined data signal delay and signal phase tuning for constructive interference at an external device (e.g., a base station antenna). In embodiments, the system uses a test process in which two of the antennas transmit a test signal to the external device, and one of the transmitting antennas iteratively applies a phase offset while transmitting the test signal. In embodiments, the external device determines an optimum phase offset (from the plural iterated values) that produces the maximized combined test signal from both antennas. After determining the optimum phase offset that produces the maximized combined test signal, the system uses a test digital signal to determine an optimum relative time delay between the signals transmitted by the two antennas.

Beam steering advantageously increases the signal to noise ratio (SNR) of the antenna system up to an order of magnitude or more compared to antenna systems that do not employ beam steering. An increased SNR reduces the amount of power used by the antenna system to transmit the radiation to a receiving antenna, and also permits a higher bandwidth in communication. As a result, beam steering systems have become a focus of the next-generation wireless communication systems including 5G. For example, it is envisioned that 5G systems will utilize fixed-location base stations (e.g., antennas) that steer beams toward users' wireless devices (e.g., smartphones, etc.) on an as-needed basis.

However, many existing devices are not constructed to communicate in 5G. For example, some implementations of 5G are envisioned to operate at frequencies between 24 GHz and 39 GHz, and to use antennas that employ beam steering. Many existing devices do not contain antenna circuitry that operates between 27 GHz and 39 GHz. For example, many existing devices (e.g., smartphones and tablet computers) are specifically designed to communicate at 3G frequencies (e.g., between 850 MHz and 2100 MHz) and/or 4G frequencies (e.g., between 600 MHz and 5200 MHz). And some existing mobile devices do not have cellular capability at all, and instead are limited to WiFi, Bluetooth, etc. These existing devices also do not contain antennas that are capable of beam steering. As a result of not being capable of operating at some anticipated 5G frequencies and not being capable of beam steering, these existing devices will not enjoy the benefits of 5G communication.

Some handheld mobile devices (e.g., phones) have phased array antennas that employ beam steering. However, these devices are prone to suffer from signal attention problems. Specifically, there is a significant impact in communication performance when a user's hand that holds a mobile device physically covers (e.g., obstructs) the phased array antenna array of the mobile device. The effective loss of antenna elements that are covered by a user's hand(s) leads to a lessening of performance of the phased-array antenna system in the form of reduced beam-steering accuracy and decreased signal-to-noise ratio.

Aspects of the invention address these shortcomings by providing a wearable accessory that connects to an existing device, where the accessory includes circuitry that is configured for 5G communication. In embodiments, the accessory includes millimeter wave circuitry and at least one phased array antenna configured for beam steering. In this way, the accessory may communicate wirelessly with external devices using 5G communication. In embodiments, the circuitry of the accessory is operatively connected to the circuitry of the device via wired or wireless connection between the accessory and the device. In this manner, the antenna(s) in the accessory can function as antenna(s) for the device, thus effectively converting a non-5G capable device into a 5G capable device.

For handheld mobile devices that already include a phased array antenna, the accessory in accordance with aspects of the invention can function as an additional or alternative phased array antenna for the device. In this configuration, aspects of the invention include determining which of the available phased array antennas currently has a best performance (e.g., best SNR, best line of sight to an external antenna, etc.), and using that determined phased array antenna to communicate with an external device.

FIG. 1 shows an exemplary phased array antenna system that may be used with aspects of the invention. In the example shown in FIG. 1, the phased array antenna system 10 comprises a 4×4 array of antenna elements 15-1, 15-2, ..., 15-$i$ included in a coin-shaped sensor 20. In this example "i" equals sixteen; however, the number of antenna elements shown in FIG. 1 is not intended to be limiting, and the phased array antenna system 10 may have a different number of antenna elements. Similarly, the implementation in the coin-shaped sensor 20 is only for illustrative purposes, and the phased array antenna system 10 may be implemented in different structures.

Still referring to FIG. 1, the arrow A represents a direction of the beam that is formed by the phased array antenna system 10 using constructive and destructive superposition of signals from the antenna elements 15-1, 15-2, ..., 15-$i$ using beam steering principles. Angle $\theta$ represents the polar angle and angle $\varphi$ represents the azimuth angle of the direction of the arrow A relative to a frame of reference 25 defined with respect to the phased array antenna system 10.

Figure 2:
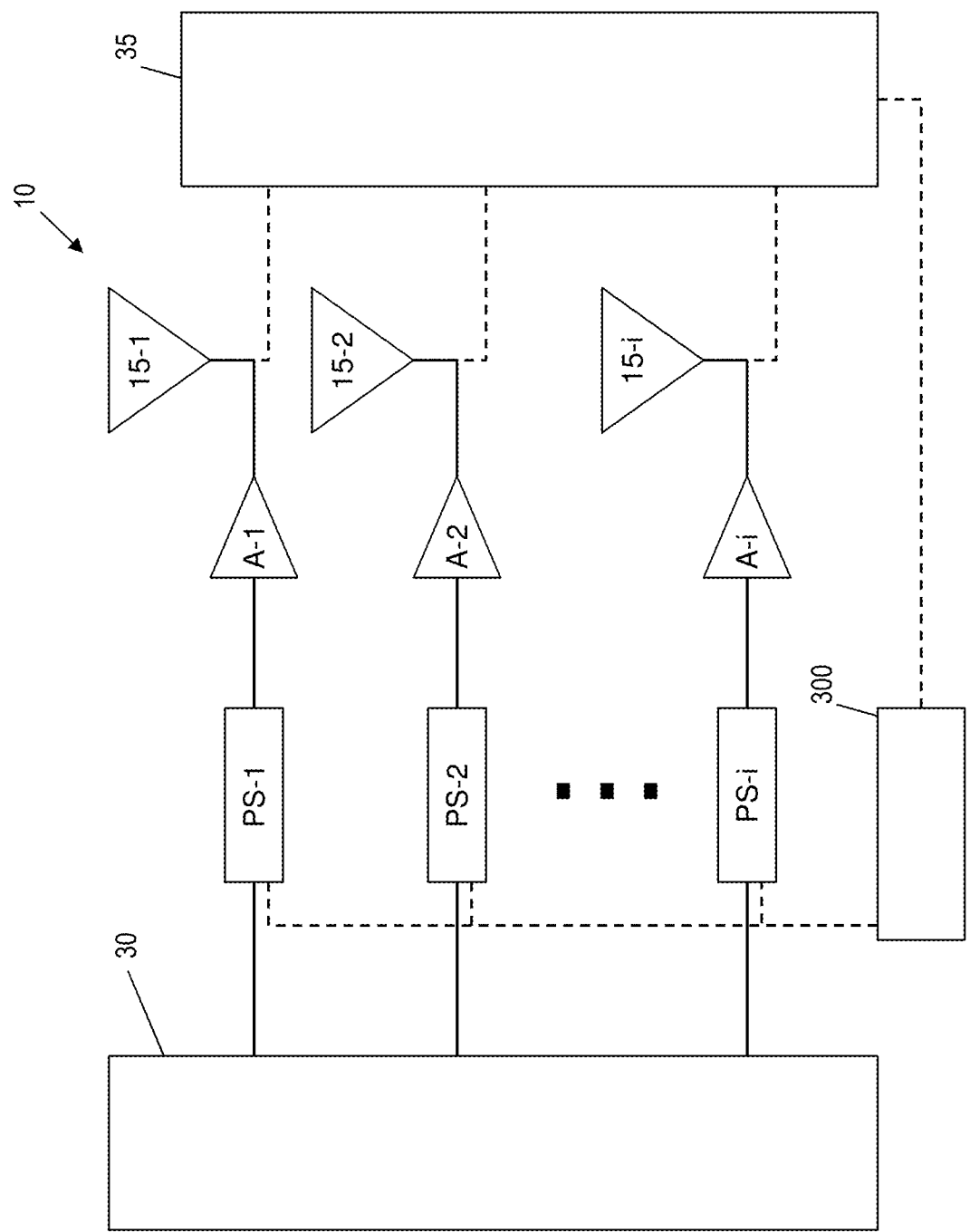
FIG. 2 shows a block diagram of an arrangement of components within the phased array antenna system.

FIG. 2 shows a block diagram of an arrangement of components within the phased array antenna system 10 in accordance with aspects of the invention. In embodiments, a respective phase shifter PS-1, PS-2, ..., PS-$i$ and amplifier A-1, A-2, ..., A-$i$ are connected to each respective one of the antenna elements 15-1, 15-2, ..., 15-$i$. In particular embodiments, the respective phase shifter PS-1, PS-2, ..., PS-$i$ and amplifier A-1, A-2, ..., A-$i$ are connected in series upstream of the respective one of the antenna elements 15-1, 15-2, ..., 15-$i$ as shown in FIG. 2. In implementations, a respective transmission signal is provided to each of the phase shifters PS-1, PS-2, ..., PS-$i$, e.g., from a power splitter 30 such as a Wilkinson power divider. A respective phase shifter (e.g., PS-$i$) shifts the phase by a predefined amount, the amplifier (A-$i$) amplifies the phase shifted signal, and the antenna element (15-$i$) transmits the amplified and phase shifted signal.

Phase shifter elements in a single phase shifter PS-$i$ can be controlled to provide a delay state, i.e., to impart a predefined phase shift on the signal passing through the phase shifter elements. In this manner, each one of the phase shifters PS-1, PS-2, ..., PS-$i$ can be individually configured, by appropriately controlling its phase shifter elements to achieve a desired phase shift for the signal that is provided to its associated antenna element, such that the combination of signals emitted by the respective antenna elements 15-1, 15-2, ..., 15-$i$ forms a beam in a desired direction A as shown in FIG. 1. As described herein, the desired direction A may be determined based on signals received from an external device.

With continued reference to FIG. 2, a control circuit 35 is configured to determine a desired direction for the beam emitted by the phased array antenna system 10, and to control the elements of the phased array antenna system 10 to form the beam in the determined desired direction. In operation, based on external signals (e.g., incoming radiation) received by the antenna elements antenna elements 15-1, 15-2, ..., 15-$i$, the control circuit 35 automatically determines a desired direction of the phased array antenna system 10 as defined by particular a combination of values of angles $\theta$ and $\varphi$. Based on determining the desired direction of the phased array antenna system 10, the control circuit 35 controls the phase shifters PS-1, PS-2, ..., PS-$i$ (via controller 300) such that the combination of signals emitted by the respective antenna elements 15-1, 15-2, . . . , 15-$i$ forms a beam (e.g., outgoing radiation) in the desired direction. Such automatic determination of a direction of a phased array antenna system is sometimes referred to as "self-installation" and/or "tracking" and is described, for example, in United States Patent Application Publication No. 2019/0089434, published Mar. 21, 2019, the contents of which are expressly incorporated by reference herein in their entirety.

FIGS. 1 and 2 show one exemplary system that may be used as a phased array antenna system 10 in accordance with aspects of the invention. Implementations of the invention are not limited to what is shown in FIGS. 1 and 2, however, and other conventional or later-developed active beam steering systems may be used in embodiments.

Figure 3B:
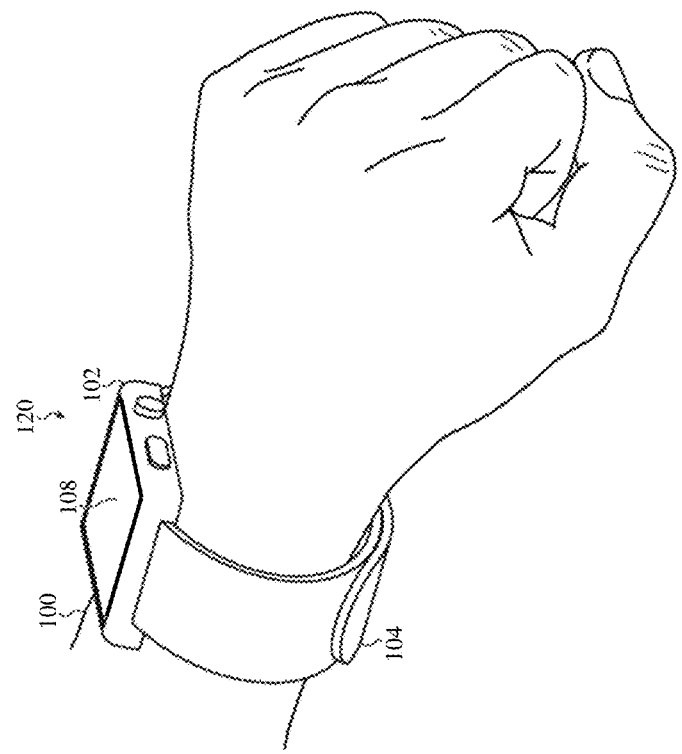
FIGS. 3A and 3B show an exemplary accessory in accordance with aspects of the invention.
Figure 3A:
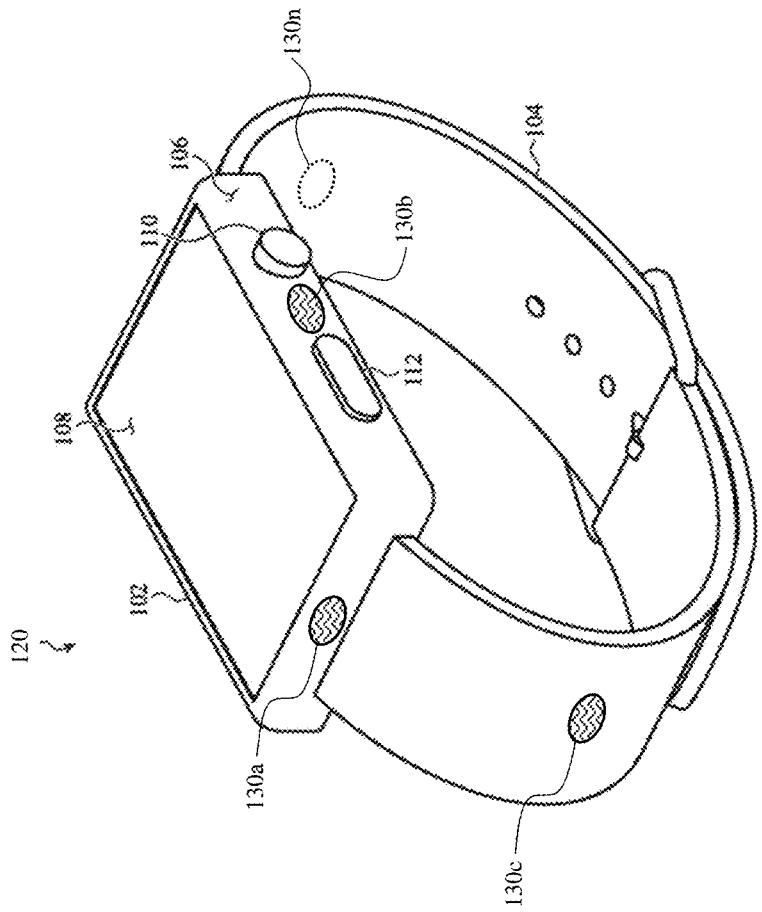

FIGS. 3A and 3B show an example of a wearable accessory 120 in accordance with aspects of the invention. In the example shown in FIGS. 3A and 3B, the accessory 120 comprises a watch (e.g., a smartwatch) that is configured to be worn or carried by a user. A typical implementation involves a user wearing the watch on their arm 100 as shown in FIG. 3B, although other implementations are contemplated within the scope of this disclosure. In embodiments, the watch includes a watch body 102 and a watch band 104. The watch and watch body 102 are examples of wearable electronic devices. The watch body 102 may include a housing 106. The housing 106 may include one or more housing members. A singular housing member is shown in FIG. 1. The housing 106 may be metallic, plastic, ceramic, or crystalline, or may include a combination of such materials, or may include other materials.

A cover 108 may be mounted to the housing 106 on a front side of the watch body 102 (i.e., facing away from a user's skin), as shown in FIG. 1. The cover 108 may protect a display within the housing 106 (and in some cases, the display may be mounted partly or wholly to the cover 108). The display may be viewable by a user through the cover 108. In some cases, the cover 108 may be part of a display stack, which display stack may include a touch sensing or force sensing capability. The display may be configured to depict a graphical output of the watch, and a user may interact with the graphical output (e.g., using a finger, stylus, crown 110, or button 112). As one example, the user may select (or otherwise interact with) a graphic, icon, or the like presented on the display. For example, the user may interact with a graphic on the display by touching or pressing on the display at the location of the graphic. The cover 108 may be considered separate from the housing 106, or alternatively, the cover 108 may be considered a component (e.g., a housing member) of the housing 106. In some examples, the cover 108 may be a crystal, such as a sapphire crystal. The cover 108 may alternatively be formed of glass, plastic, or another material (or materials) that is transmissive to at least one wavelength of light (e.g., visible light).

The watch body 102 may include at least one input device or selection device, such as a crown assembly, scroll wheel, knob, dial, button, or the like, which input device may be operated by a user of the watch. For example, the housing 106 may include an aperture through which a shaft extends. A crown 110 may be attached to the shaft, and may be accessible to a user exterior to the housing 106. The crown 110 may be manipulated by a user to rotate or translate the shaft. The shaft may be mechanically, electrically, magnetically, and/or optically coupled to components within the housing 106 as one example. A user's manipulation of the crown 110 and shaft may be used, in turn, to manipulate or select various elements displayed on the display, to adjust a volume of a speaker, to turn the watch on or off, and so on. The housing 106 may also include an aperture through which a button 112 protrudes.

The housing 106 may include structures for attaching the watch band 104 to the watch body 102. In some cases, the structures may include elongate recesses or apertures through which ends of the watch band 104 may be inserted and attached to the watch body 102. In other cases (not shown), the structures may include indents (e.g., dimples or depressions) in the housing 106, which indents may receive ends of spring pins that are attached to or threaded through ends of a watch band to attach the watch band to the watch body.

The watch band 104 may be used to secure the watch to a user, another device, a retaining mechanism, and so on.

In some examples, the watch may lack the cover 108, the display, the crown 110, or the button 112. For example, the watch may include an audio input or output interface, a touch input interface, a haptic (force) input or output interface, or other input or output interface that does not require the display, crown 110, or button 112. The watch may also include the afore-mentioned input or output interfaces in addition to the display, crown 110, or button 112. When the watch lacks the display, the front side of the watch may be covered by the cover 108, or by a metallic or other type of housing member.

In some embodiments, the cover 108 may include any transparent, semi-transparent, or translucent surface made out of glass, a crystalline material (such as sapphire or zirconia), plastic, or the like, has and may have a crystal or non-crystalline atomic structure.

As shown in FIGS. 3A and 3B, and in accordance with aspects of the invention, the accessory 120 includes at least one phased array antenna 130$a$ configured to communicate wirelessly with an external device using beam steering. As shown in FIGS. 3A and 3B, the accessory 120 may include plural phased array antennas 130$a$-$n$ where "n" is any desired integer greater than one.

In the example of the watch shown in FIG. 3A, a first phased array antenna 130$a$ is arranged at a first surface of the housing 106, a second phased array antenna 130$b$ is arranged at a second surface of the housing 106, a third phased array antenna 130$c$ is arranged at a first portion of the watch band 104, and a fourth phased array antenna 130$b$ is arranged at a second portion of the watch band 104, with the phased array antennas 130$a$-$n$ positioned in such a manner that they send and receive signals that radiate outward from their location on the watch. In embodiments, the phased array antennas 130$a$-$n$ are arranged at or on different surfaces of the watch that face different directions when the watch is worn in the arm 100 of (or otherwise carried by) the user. For example, as shown in FIG. 3A, the first phased array antenna 130$a$ is on a first surface of the housing 106 that faces in a first direction and the second phased array antenna 130$b$ is on a second surface of the housing 106 that faces in a second direction that is different than first direction. In this particular example, the first surface of the housing 106 and the second surface of the housing 106 are substantially perpendicular relative to one another, such that the first direction of the first phased array antenna 130$a$ and the second direction of the second phased array antenna 130$b$ are about 90° apart. By positioning different phased array antennas 130$a$-$n$ on surfaces facing in different directions, there is an increased likelihood that, at any given time as a user is walking through an environment, at least one of the phased array antennas 130a-n will have a direct line of sight to an external device with which to communicate wirelessly.

Still referring to FIG. 3A, in embodiments the watch may include one or more phased array antennas incorporated in the watch band 104. When plural phased array antennas incorporated in the watch band 104, they may be located such that they face in different directions relative to one another. For example, as shown in FIG. 3A, phased array antenna 130c and phased array antenna 130n are located on the watch band 104 such that they face in different outward directions (relative the watch band 104) when the watch is worn on the arm of the user. In embodiments, the watch may include one or more phased array antennas only on the housing 106, one or more phased array antennas only on the watch band 104, or a combination of one or more phased array antennas on the housing 106 and one or more phased array antennas on the watch band 104.

In embodiments, each phased array antenna 130a-n includes plural antenna elements (e.g., antenna elements 15-1, 15-2, ..., 15-i as shown in FIG. 1) of a phased array antenna system (e.g., phased array antenna system 10) that may be used for wireless communication (e.g., 5G) between the accessory 120 and other devices. In embodiments, each phased array antenna 130a-n is configured for millimeter wave communications at frequencies between about 10 GHz and 300 GHz, and more preferably between 27 GHz and 39 GHz. The radiating elements in each phased array antenna 130a-n may be patch antennas, dipole antennas, Yagi (Yagi-Uda) antennas, or other suitable antenna elements. Millimeter wave transceiver circuitry can be integrated with each phased array antenna 130a-n to form integrated phased array antenna systems and transceiver circuit modules or packages (sometimes referred to as integrated antenna modules or antenna modules) if desired.

Each of the phased array antennas 130a-n may be on an exterior surface of the watch, or may be inside a portion of the watch and covered by a material that is essentially transparent to RF signals communicated by the phased array antenna.

Figure 4:
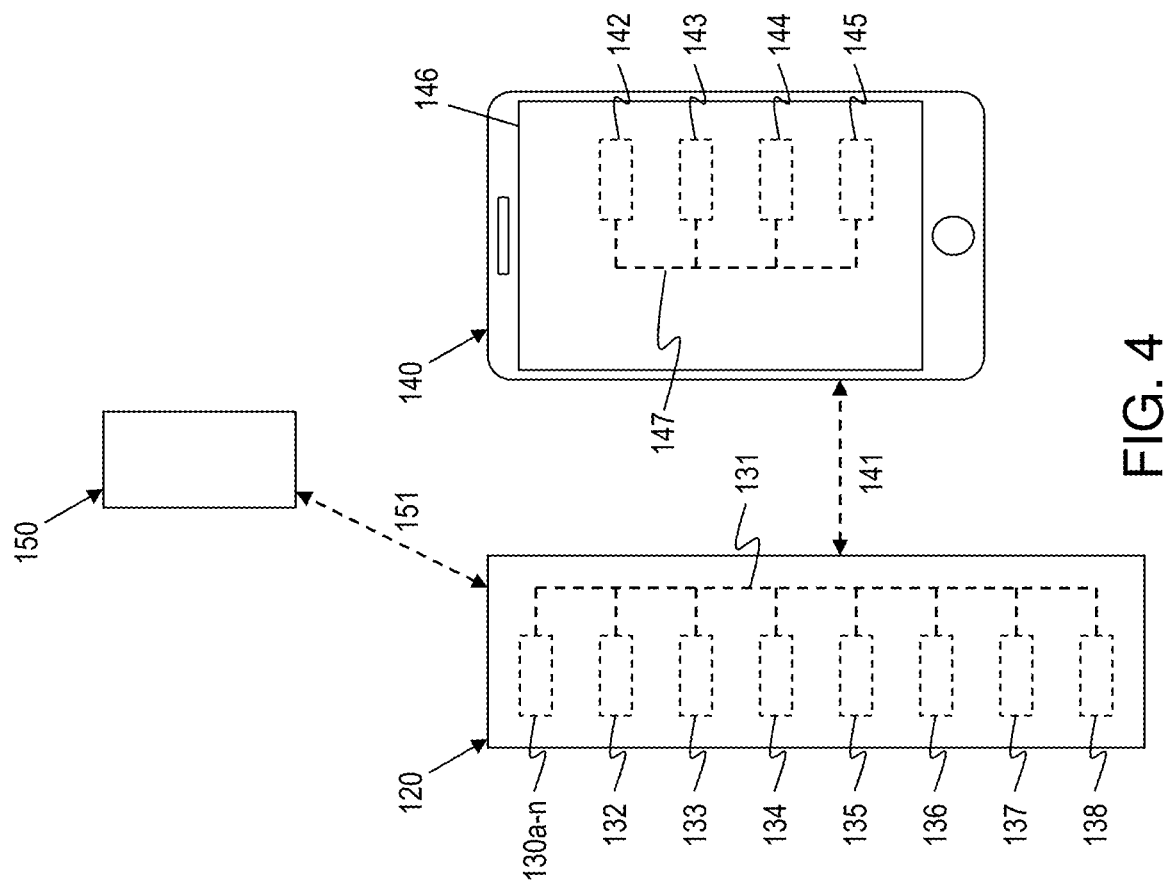
FIG. 4 shows an exemplary system in accordance with aspects of the invention.

FIG. 4 shows a block diagram of a system in accordance with aspects of the invention. The system includes the accessory 120 (e.g., the watch as shown in FIG. 3A and FIG. 3B), an electronic device 140, and an external device 150. The electronic device 140 is representative of a smartphone or tablet computing device, although implementations of the invention are not limited to use with these particular examples and instead may be used with other types of mobile electronic devices that utilize wireless communication. The electronic device 140 may include components such as control circuitry 142 (e.g., one or more microprocessors, microcontrollers, digital signal processors, baseband processor integrated circuits, application specific integrated circuits, etc.), memory 143, battery 144, wireless communication system 145, and an I/O system such as touch screen 146, all operatively connected by circuitry 147. In embodiments, the accessory 120 communicates locally with the electronic device 140 as indicated at arrow 141.

The external device 150 is representative of an antenna that is part of a wireless communication network, in particular an antenna that uses beam steering and millimeter wave communication. The external device 150 may comprise, for example, a phased array antenna that is mounted at a fixed location (e.g., on a light pole in a city block), and may be one of many such phased array antennas that a service provider uses to provide a 5G wireless communication network for its subscribers. In embodiments, the accessory 120 communicates with the external device 150 as indicated at arrow 151.

Still referring to FIG. 4, in embodiments the accessory 120 is a watch including one or more of circuitry 131, control circuitry 132, wireless circuitry 133, power source 134, local communication system 135, memory 136, sensor 137, and display 138. Circuitry 131 may be used to operatively connect components within the accessory, and may comprise a bus for example. Control circuitry 132 is circuitry that controls operation of components of the accessory 120, and may include one or more microprocessors, microcontrollers, digital signal processors, baseband processor integrated circuits, application specific integrated circuits, etc. Control circuitry 132 may be configured to control the output of the display 138. amongst other functions. Wireless circuitry 133 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals.

Power source 134 may be implemented using any device capable of providing energy to the accessory 120. For example, the power source 134 may be one or more batteries or rechargeable batteries. Additionally or alternatively, the power source 134 may be a power connector or power cord that connects the accessory 120 to another power source, such as a wall outlet.

Memory 136 may store electronic data that can be used by the accessory 120. For example, the memory 136 may store electrical data or content such as, for example, audio and video files, documents and applications, device settings and user preferences, timing signals, control signals, data structures or databases, or reference sets of features used in a bioauthentication, health monitoring, or health assessment operation. The memory 136 can be configured as any type of memory. By way of example only, the memory 136 may be implemented as random access memory, read-only memory, Flash memory, removable memory, other types of storage elements, or combinations of such devices.

Sensor 137 may include one or more sensors that are configured to sense one or more type of parameters, such as but not limited to, pressure, light (e.g., a light field), touch, heat, movement, relative motion, biometric data (e.g., biological images or parameters), and so on. For example, the sensor(s) 137 may include a heat sensor, a position sensor, a light or optical sensor, an accelerometer, a pressure transducer, a gyroscope, a magnetometer, a health monitoring sensor, a light field camera, and so on. Additionally, the sensor(s) 137 can utilize any suitable sensing technology, including, but not limited to, capacitive, ultrasonic, resistive, optical, light field, ultrasound, piezoelectric, and thermal sensing technology.

Display 138 may include a light-emitting display. As described with respect to FIG. 3A, in one example, the display 138 and the cover 108 may be part of a touch sensitive input-output (I/O) mechanism (e.g., a touch screen display).

With continued reference to FIG. 4, the local communication system 135 facilitates local communication between the accessory 120 and the electronic device 140 as depicted by arrow 141. In a wired implementation, the local communication system 135 may comprise a port in the accessory 120, the port receiving a wire that is physically connected to a port of the electronic device 140. In a wireless implementation, the local communication system 135 may comprise one or more antennas that communicate wirelessly with one or more antennas of the electronic device 140. Any suitable wireless communication protocol may be used, non-limiting examples of which include Bluetooth and 60 GHz local wireless.

Still referring to the local communication system 135 as shown in FIG. 4, in both wired and wireless implementations of the local communication system 135, the phased array antennas 130*a-n* are connected to the local communication system 135 by the circuitry 131 in the accessory 120. In this manner, data that is received by any one of the phased array antennas 130*a-n* (e.g., via incoming wireless communication from the external device 150) may be communicated to the electronic device 140 via the circuitry 131 and the local communication system 135. Similarly, data that is to be transmitted by any one of the phased array antennas 130*a-n* (e.g., via outgoing wireless communication to the external device 150) may be communicated from the electronic device 140 to the accessory via the local communication system 135. In this manner, the phased array antennas 130*a-n* function as antennas for the electronic device 140. Because the phased array antennas 130*a-n* are configured for true 5G communication (e.g., millimeter wave communication at frequencies between about 10 GHz and 300 GHz using beam steering), the accessory 120 provides 5G communication functionality to the electronic device 140 even if the electronic device 140 is not capable of 5G communication using its own antenna(s). As such, the accessory 120 can be used to convert a non-5G device to function as a 5G device, which provides an immense benefit to non-5G devices operating in a 5G environment.

In embodiments, the local communication system 135 is also used to communicate data from the electronic device 140 to the accessory 120 for use in generating an output of the display 138 (e.g., the watch display). In this manner, the accessory 120 may use data stored on the electronic device 140 in generating an output for the display 138.

In embodiments, the local communication system 135 is also used to communicate audio data from the electronic device 140 to the accessory 120 for playing via a loudspeaker of the accessory 120. In this manner, the accessory 120 may play music or other audio that is stored on the electronic device 140.

As described herein, the accessory 120 may contain plural phased array antennas 130*a-n*, each of which is configured to communicate with the external device 150 using beam steering as indicated at arrow 151. Plural ones of the phased array antennas 130*a-n* may be used together or one of the antennas may be switched into use while other antenna(s) are switched out of use. If desired, the control circuitry 132 may be used to select an optimum antenna to use in the accessory 120 in real time and/or to select an optimum setting for adjustable wireless circuitry associated with one or more of antennas. For example, if one of the phased array antennas 130*a-n* does not face or have a line of sight to the external device 150, then another one of phased array antennas 130*a-n* that has line of sight to the external device may be switched into use and that phased array antenna may use beam steering to optimize wireless performance. Antenna adjustments may be made to tune antennas to perform in desired frequency ranges, to perform beam steering with a phased antenna array, and to otherwise optimize antenna performance. Sensors may be incorporated into antennas to gather sensor data in real time that is used in adjusting antennas if desired.

In embodiments, the power source 134 (e.g., battery) in the accessory 120 is used to power the phased array antennas 130*a-n* and the wireless circuitry 133 in the accessory 120. In this manner, when the accessory 120 is acting as the antenna for the electronic device 140, the electronic device 140 is not using its own battery to power wireless communication to an external device (other than the local communication between the electronic device 140 and the accessory 120). As a result, using the accessory 120 can reduce the power used by the electronic device 140, thereby resulting in longer battery life per battery charge for the electronic device 140. The total power consumption of the system may be further reduced when using a phased array antenna on the accessory 120 that has a better SNR than the antenna on the electronic device 140.

Transmission line paths may be used to route antenna signals within the accessory 120. For example, transmission line paths may be used to couple antennas to transceiver circuitry. Transmission line paths in the accessory 120 may include coaxial cable paths, microstrip transmission lines, stripline transmission lines, edge-coupled microstrip transmission lines, edge-coupled stripline transmission lines, waveguide structures for conveying signals at millimeter wave frequencies (e.g., coplanar waveguides or grounded coplanar waveguides), transmission lines formed from combinations of transmission lines of these types, etc.

Transmission line paths in the accessory 120 may be integrated into rigid and/or flexible printed circuit boards if desired. In one suitable arrangement, transmission line paths in the accessory 120 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Figure 5:
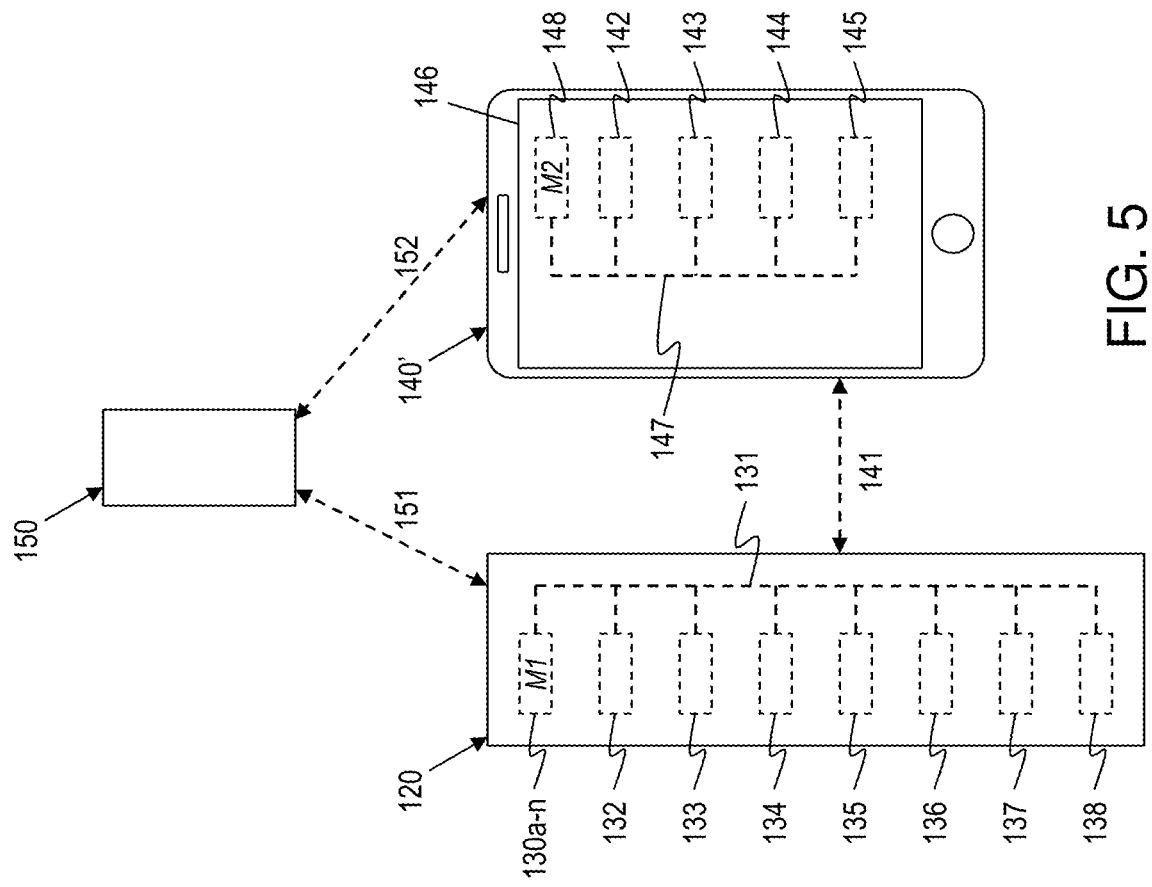
FIG. 5 shows an exemplary system in accordance with aspects of the invention.

FIG. 5 illustrates another implementation of the accessory 120 in accordance with aspects of the invention. The accessory 120 and the external device 150 in FIG. 5 are the same as those described with respect to FIG. 4. The electronic device 140' in FIG. 5 has the same components as that of electronic device 140 of FIG. 4, and additionally includes at least one phased array antenna 148 that is configured to communicate with the external device 150 using millimeter wave frequencies and beam steering as indicated at arrow 152. Thus, in the implementation shown in FIG. 5, each of the accessory 120 and the electronic device 140' include at least one phased array antenna that is configured to communicate with the external device 150 using millimeter wave frequencies and beam steering, whereas in the implementation shown in FIG. 4 only the accessory 120 has such capability (i.e., since the electronic device 140 of FIG. 4 does not include a phased array antenna).

In embodiments, the control circuitry of the accessory 120 and the control circuitry of the electronic device 140' cooperate to determine an optimum antenna from the group including the phased array antennas 130*a-n* on the accessory 120 and the phased array antenna 148 on the electronic device 140'. In embodiments, the control circuitry determines an optimum antenna by determining which of the plural different phased array antennas (i.e., including the phased array antennas 130a-n on the accessory 120 and the phased array antenna 148 on the electronic device 140') currently has a best signal to the external device 150. In embodiments, the control circuitry determines which of the plural different phased array antennas has the best signal to the external device based on comparing transmit-receive conditions of the plural different phased array antennas. In embodiments, the transmit-receive conditions used in the comparison may include at least one of: strength of signal between the accessory and the external device for each respective one of the plural different phased array antennas; and signal to noise ratio for each respective one of the plural different phased array antennas. Based on comparing the transmit-receive conditions of the plural different phased array antennas, the control circuitry deems one of the plural different phased array antennas as having the best signal to the external device.

In embodiments, after determining the one of the plural different phased array antennas as having the best signal to the external device 150, the control circuitry uses that determined antenna to communicate with the external device and switches out of use the other ones of the plural different phased array antennas. The control circuitry repeats this determining an optimum antenna on a frequent basis, and in this manner the system can operate to change in real time which antenna is used to communicate with the external device 150.

An exemplary use case is now described to illustrate this functionality. In the use case, a user is wearing the accessory (watch) 120 on their head and holding the electronic device (smartphone) 140' in their hand. As the user walks along a sidewalk at a first time, the control circuitry of the accessory 120 and that of the electronic device 140' make a first determination that antenna 130b (on the accessory 120) is currently the optimum antenna. Based on this first determination, the control circuitry of the accessory 120 uses antenna 130b to communicate with the external device 150. Also based on this first determination, the control circuitry of the accessory 120 does not use the other antennas 130a, 130c, and 130n on the accessory 120 to communicate with the external device 150. Also based on this first determination, the control circuitry of the electronic device 140' does not use the antenna 148 on the electronic device 140' to communicate with the external device 150.

Still referring to the exemplary use case, as the user continues to walk along the sidewalk at a second time after the first time, the control circuitry of the accessory 120 and that of the electronic device 140' make a second determination that antenna 148 (on the electronic device 140') is currently the optimum antenna. This change might occur, for example, because the user's position relative to the external device 150 has changed, such that the antenna 148 now has a better line of sight to the external device 150 compared to the other antennas 130a-n. Based on this second determination, the control circuitry of the electronic device 140' uses antenna 148 to communicate with the external device 150. Also based on this second determination, the control circuitry of the accessory 120 does not use the other antennas 130a, 130b, 130c, and 130n on the accessory 120 to communicate with the external device 150.

In embodiments, when determining an optimum antenna to use as described with respect to FIG. 5, the control circuitry of the accessory 120 and the control circuitry of the electronic device 140' cooperate to make the determination. In embodiments, this determining involves handshaking between the control circuitry of the accessory 120 and the control circuitry of the electronic device 140' (and one or more other devices as described above, when applicable). In one example of such handshaking, the control circuitry of one of the devices (e.g., the accessory 120 or the electronic device 140') periodically interrogates the control circuitry of the other one of the devices (e.g., the other one of accessory 120 or the electronic device 140') to gather real time information about the performance of all available antennas (e.g., antennas 130a-n and antenna 148). In one example, the control circuitry of the accessory 120 determines transmit-receive conditions of the antennas 130a-n on the accessory 120, and the control circuitry of the electronic device 140' determines transmit-receive conditions of the antenna 148 on the electronic device 140'. In this example, the control circuitry of the accessory 120 transmits the determined transmit-receive conditions of the antennas 130a-n to the electronic device 140', and the control circuitry of the electronic device 140' compares all the data to make the determination of the optimum antenna. The control circuitry of the electronic device 140' then transmits a control signal to the accessory 120 that instructs the accessory to use or not use certain ones of the antennas 130a-n based on the determination. This is but one example, and other cooperative arrangements may be used.

In another example, the control circuitry of the accessory 120 determines transmit-receive conditions of the antennas 130a-n on the accessory 120, and the control circuitry of the electronic device 140' determines transmit-receive conditions of the antenna 148 on the electronic device 140'. In this example, the control circuitry of the electronic device 140' transmits the determined transmit-receive conditions of the antenna 148 to the accessory 120, and the control circuitry of the accessory 120 compares all the data to make the determination of the optimum antenna. The control circuitry of the accessory 120 then transmits a control signal to the electronic device 140' that instructs the electronic device 140' to use or not use the antenna 148 based on the determination. This is but one example, and other cooperative arrangements may be used.

This aspect is not limited to two devices and instead may be implemented with more than two devices. For example, a user may utilize the accessory 120, the electronic device 140', and at least one other device (such as headphones or an augmented reality headset) that also has one or more phased array antennas. Accordingly, in further embodiments, the control circuitry (e.g., of the accessory 120 and/or the electronic device 140') may utilize the techniques described above to determine an optimum antenna from the group including: (i) the phased array antennas 130a-n on the accessory 120; (ii) the phased array antenna 148 on the electronic device 140'; and (iii) one or more phased array antennas on one or more other devices communicating with the electronic device 140'. In this scenario, the control circuitry determines an optimum antenna by determining which of the plural different phased array antennas (i.e., including the phased array antennas 130a-n on the accessory 120, the phased array antenna 148 on the electronic device 140', and the one or more phased array antennas on one or more other devices) currently has a best signal to the external device 150. Based on comparing the transmit-receive conditions of the plural different phased array antennas, the control circuitry deems one of the plural different phased array antennas as having the best signal to the external device, and transmits control signals to the various devices to enable and disable other ones of the phased array antennas based on this determination. The control circuitry repeats this determining an optimum antenna on a frequent basis, and in this manner the system can operate to change in real time which antenna is used to communicate with the external device 150.

With continued reference to FIG. 5, according to aspects of the invention, signals transmitted from two of the plural different phased array antennas (i.e., including the phased array antennas 130a-n on the accessory 120 and the phased array antenna 148 on the electronic device 140') are constructively combined at the external device 150. Constructively combining the signals from two different ones of the antennas operates to boost the effectiveness of the transmissions since the combined signals have a higher effective SNR than either transmitting antenna alone.

In an exemplary use case, consider antenna 130a on accessory 120 to be source M1 and antenna 148 on electronic device 140' to be source M2. In a first step, the phases of the signals transmitted from M1 and M2 are adjusted such that the signals combine constructively at external device 150. In one example, a constant phase offset is added to all the phase shifters in either M1 or M2 that allows test signals (e.g., purely sinusoidal signals) to combine constructively at the external device 150. This adjustment of phase is made with a handshaking protocol with the external device 150 such that the phase offset (P1) is applied to the elements in the phased array (e.g., from 0-180 degrees). The P1 value is adjusted until the combined signal at the external device 150 is maximized. The P1 value is transmitted to the external device 150 as well during the handshaking protocol. In this example, the sources M1 and M2 concurrently transmit the test signal to the external device 150, with one of the sources (M1 or M2) applying the phase offset P1 through a range of values of P1. During these transmissions, the external device 150 determines a magnitude of the combined test signal for each different value of P1. After the transmission has swept through the range of values for P1, the external device 150 then sends back the P1 value that maximized the combined test signal.

In this example, after determining the value of P1 that maximized the combined test signal, the system determines a relative time delay T1 of the test signals. In this manner, a baseband/digital data signal to be transmitted is distributed from M2 to M1 or from M1 to M2. In one example, a test digital signal (e.g., a sequence of saw tooth patterns and steps of various duty cycles) is used on repeat. The test signal is applied after P1 is determined, then the relative time delay (T1) of the test signals is adjusted until the signal received at the external device 150 is maximized and the digital reception of the known test signal is faithfully reproduced from the combined signals at the external device 150.

In embodiments, a handshaking protocol is used to determine P1 and T1. Alternatively, values of P2 and T2 may be determined. It is noted that this use case is an example, and other techniques may be used to determine transmission characteristics of M1 and M2 that result in an optimum constructive interference at the external device 150.

This aspect is not limited to two devices and instead may be implemented with more than two devices. For example, a user may utilize the accessory 120, the electronic device 140', and at least one other device (such as headphones or an augmented reality headset) that also has one or more phased array antennas. Accordingly, in further embodiments, the control circuitry (e.g., of the accessory 120 and/or the electronic device 140') may utilize the techniques described above to constructively combine the signals from plural different antennas selected from the group including: (i) the phased array antennas 130a-n on the accessory 120; (ii) the phased array antenna 148 on the electronic device 140'; and (iii) one or more phased array antennas on one or more other devices communicating with the electronic device 140', in order to boost the effectiveness of the transmissions since the combined signals have a higher effective SNR than any single one of the transmitting antennas alone.

FIG. 6 shows a flowchart of an exemplary method in accordance with aspects of the invention. The steps of the method are described using reference numbers of elements described herein when appropriate.

At step 620, the control circuitry determines an optimum phased array antenna with a best signal to the external device 150 with which the device is communicating. In embodiments, the determination at step 620 takes into account all of the phased array antennas in the system including the phased array antennas 130a-n on the accessory 120 and the phased array antenna 148 on the device 140'.

In embodiments, the control circuitry determines which of the plural different phased array antennas has the best signal to the external device based on comparing transmit-receive conditions of the plural different phased array antennas. In embodiments, the transmit-receive conditions used in the comparison may include at least one of: strength of signal between the accessory and the external device for each respective one of the plural different phased array antennas; and signal to noise ratio for each respective one of the plural different phased array antennas. Based on comparing the transmit-receive conditions of the plural different phased array antennas, the control circuitry deems one of the plural different phased array antennas as having the best signal to the external device.

In some embodiments, and as described with respect to FIG. 5, step 620 includes the control circuitry of the accessory 120 determining transmit-receive conditions of the antennas 130a-n on the accessory 120, and the control circuitry of the electronic device 140' determines transmit-receive conditions of the antenna 148 on the electronic device 140'. In this example, the control circuitry of the accessory 120 transmits the determined transmit-receive conditions of the antennas 130a-n to the electronic device 140', and the control circuitry of the electronic device 140' compares all the data to make the determination of the optimum antenna. In other embodiments, as described with respect to FIG. 5, the roles are reversed such that the control circuitry of the accessory 120 compares all the data to make the determination of the optimum antenna.

At step 625, the control circuitry uses the determined phased array antenna, as determined at step 620, to communicate with the external device. In embodiments, step 625 comprises the control circuitry causing the determined phased array antenna to transmit signals to and/or receive signals from the external device, e.g., using millimeter wave signals such as 5G signals. In embodiments, step 625 comprises the control circuitry determining an optimal direction (e.g., similar to direction A shown in FIG. 1), and controls the determined phased array antenna to form a beam in the determined optimal direction (e.g., as described with respect to FIGS. 1 and 2) to facilitate wireless communication with the external device.

In some embodiments, and as described with respect to FIG. 5, step 625 includes the control circuitry of the electronic device 140' transmitting a control signal to the accessory 120 that instructs the accessory to use or not use certain ones of the antennas 130a-n based on the determination of step 620. In other embodiments, as described with respect to FIG. 5, the roles are reversed such that the control circuitry of the accessory 120 transmits a control signal to the electronic device 140'.

FIG. 7 shows a flowchart of an exemplary method in accordance with aspects of the invention. The steps of the method are described using reference numbers of elements described herein when appropriate.

At step 715, the system determines a respective optimal beam direction for each phased array antenna to an external device. In embodiments, and with reference to the example shown in FIG. 5, the system determines an optimum direction A1 of a beam of a phased array antenna M1 on accessory 120 to an external device 150, and also determines an optimum direction A2 of a beam of a phased array antenna M2 on the electronic device 140' to an external device 150. The beam direction may be determined by control circuitry in the respective devices, e.g., in a manner similar to that described with respect to beam direction A of FIG. 1 and control circuit 35 of FIG. 2.

At step 720, the system determines an optimum phase offset between two transmitting antennas. In embodiments, and as described with respect to FIG. 5, a phased array antenna M1 on accessory 120 and a phased array antenna M2 on the electronic device 140' each transmit a test signal to the external device 150, using their respective beam directions A1 and A2 as determined at step 715. While both antennas are transmitting the test signal, one of the antennas applies a phase offset to it transmission, the phase offset being iteratively applied through a range of values (e.g., 0 to 180 degrees). The external device 150 receives the transmission from each antenna M1 and M2 and determines a combined signal strength that results from constructive interference for each value of phase offset P1, and from this determines a single value of phase offset P1 that results in the best combined signal strength of the test signal.

At step 725, the system determines an optimum time delay between the same two transmitting antennas. In embodiments, and as described with respect to FIG. 5, the phased array antenna M1 on accessory 120 and the phased array antenna M2 on the electronic device 140' each transmit a test digital signal to the same external device 150. While both antennas are transmitting the test digital signal with the phase offset P1 determined at step 720, the system iteratively adjusts a relative time delay T1 between the test digital signals. The external device 150 receives the transmission from each antenna M1 and M2 and determines a combined signal strength that results from constructive interference for each value of relative time delay T1, and from this determines a single value of relative time delay T1 that results in the best combined signal strength of the test digital signal.

At step 730, the antennas transmit to the external device using the optimum phase offset and the optimum relative time delay. In this manner, the phased array antenna M1 on accessory 120 and the phased array antenna M2 on the electronic device 140' each transmit a signal to an external device 150 using the optimum phase offset (determined at 720) and the optimum relative time delay (determined at step 725). In this manner, the antennas M1 and M2 transmit using a phase offset and a relative time delay that results in an optimum constructive interference at the external device.

FIG. 8 shows a flowchart of an exemplary method in accordance with aspects of the invention. The steps of the method are described using reference numbers of elements described herein when appropriate.

At step 815, the system determines a respective optimal beam direction for each phased array antenna to an external device. In embodiments, and with reference to the example shown in FIG. 5, the system determines an optimum direction A1 of a beam of a phased array antenna M1 on accessory 120 to an external device 150, and also determines an optimum direction A2 of a beam of a phased array antenna M2 on the electronic device 140' to an external device 150. The beam direction may be determined by control circuitry in the respective devices, e.g., in a manner similar to that described with respect to beam direction A of FIG. 1 and control circuit 35 of FIG. 2.

At step 815, the antennas M1 and M2 may both be communicating with a same external device (e.g., device 150), or each antenna M1 and M2 may be communicating with a different external devices (e.g., different instances of device 150). For example, antenna M1 may be communicating with a first instance of device 150 that is mounted on a building, and antenna M2 may be communicating with a second instance of device 150 that is mounted on a tower.

At step 815, the antennas M1 and M2 may both be communicating with the external device(s) 150 using different frequencies. For example, antenna M1 may be communicating with an external device at a first frequency F1, and antenna M2 may be communicating with the same or a different external device at a second frequency F2 that is different than the first frequency F1.

At step 820, each antenna M1 and M2 receives data from the external device for which the beam direction was determined at step 815. In embodiments, step 820 involves the antennas M1 and M2 using millimeter wave communication and beam forming along the determined directions A1 and A2.

At step 825, one of the devices transmits the data it received at step 820 to the other one of the devices. In embodiments, one of the devices (e.g., one of accessory 120 and electronic device 140') transmits the data it received at step 820 to the other one of the devices (e.g., the other one of one of accessory 120 and electronic device 140'). In embodiments, the data transfer at step 825 is performed using a high speed local communication protocol, such as Bluetooth, 60 GHz local wireless, etc.

At step 830, the device that received data from the other device at step 825 uses the received data in conjunction with the data that this device received at step 820. For example, if step 825 involves accessory 120 sending its data to electronic device 140', then at step 830 the electronic device 140' uses the data it received at step 820 (from its respective external device) in conjunction with the data it received at step 825 (from the accessory 120). In another example, the roles are reversed. In this manner, the two devices (accessory 120 and electronic device 140') function as plural conduits for obtaining data that is used by a single one of the devices (accessory 120 or electronic device 140'). As used herein, using the data in conjunction may include, for example and without limitation, combining the data (e.g., for streaming, to re-build a file or object, etc.), using the data for two different apps running concurrently, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An accessory for an electronic device, the accessory comprising:
    a watch comprising a housing and a band connected to the housing;
    at least one phased array antenna on the watch, the at least one phased array antenna comprising an array of antenna elements that are configured to form a beam in a determined direction, the at least one phased array antenna being configured to communicate data wirelessly with an external device on behalf of the electronic device;
    a local communication system in the watch, the local communication system configured to communicate the data locally with the electronic device; and
    a battery in the watch, the battery operatively connected to each of the at least one phased array antenna and the local communication system.

2. The accessory of claim 1, wherein the watch comprises a touch screen display.

3. The accessory of claim 2, wherein:
    the local communication system receives the data from the electronic device; and
    the at least one phased array antenna communicates the data to the external device using millimeter wave frequency communication and beam steering.

4. The accessory of claim 2, wherein:
    the at least one phased array antenna receives the data from the external device using millimeter wave frequency communication and beam steering; and
    the local communication system transmits the data to the electronic device.

5. The accessory of claim 2, wherein the local communication system utilizes a wired connection between the watch and the electronic device.

6. The accessory of claim 2, wherein the local communication system utilizes wireless communication between the watch and the electronic device.

7. The accessory of claim 6, wherein the wireless communication is 60 GHz local wireless.

8. The accessory of claim 2, wherein the at least one phased array antenna comprises plural phased array antennas.

9. The accessory of claim 8, wherein the plural phased array antennas are on plural different surfaces of the watch facing in plural different directions.

10. The accessory of claim 8, wherein control circuitry in the watch determines an optimum one of the plural phased array antennas and uses the determined optimum one of the plural phased array antennas to communicate with the external device.

11. The accessory of claim 10, wherein the control circuitry in the watch does not use other ones of the plural phased array antennas to communicate with the external device while using the determined optimum one of the plural phased array antennas to communicate with the external device.

12. The accessory of claim 2, wherein the at least one phased array antenna comprises:
    at least one first phased array antenna at the housing; and
    at least one first phased array antenna at the band.

13. The accessory of claim 2, wherein the at least one phased array antenna operates between 27 GHz and 39 GHz.

14. The accessory of claim 2, wherein the at least one phased array antenna comprises plural phased array antennas on the band facing in different directions outward relative to the band.

15. The accessory of claim 2, wherein the at least one phased array antenna is inside a portion of the watch and is covered by a material that is essentially transparent to RF signals communicated by the at least one phased array antenna.

16. The accessory of claim 2, wherein the battery in the watch powers the at least one phased array antenna while the at least one phased array antenna communicates wirelessly with the external device on behalf of the electronic device, thereby permitting the electronic device reduce its own power consumption by not using its own antenna to communicate wirelessly with the external device.

17. A method of using the accessory of claim 1, the method comprising determining an optimum phased array antenna for communication with the external device, wherein the optimum phased array antenna is determined from a set of antennas including: the at least one phased array antenna on the watch, and at least one other phased array antenna on the electronic device.

18. The method of claim 17, further comprising: using the determined optimum phased array antenna to communicate with the external device; and not using any other phased array antennas included in the set of antennas to communicate with the external device while using the determined optimum phased array antenna to communicate with the external device.

19. A method of using the accessory of claim 1, the method comprising using first data in conjunction with second data, the first data being received via the at least one phased array antenna on the watch communicating with the external device using a first determined beam direction, and the second data being received via at least one other phased array antenna on the electronic device communicating with the external device, or another external device, using a second determined beam direction.

20. The accessory of claim 1, wherein the electronic device is selected from the group consisting of a mobile phone, a smartphone, and a tablet computing device, and the external device is selected from the group consisting of a base station antenna, a cell tower, a phased array antenna, and a wireless communication network antenna.

* * * * *